(12) United States Patent
Piet et al.

(10) Patent No.: US 8,714,474 B2
(45) Date of Patent: May 6, 2014

(54) AIRCRAFT WITH AT LEAST ONE NET FOR REDUCING AERODYNAMIC NOISE FROM A STRUCTURAL ELEMENT OF THE AIRCRAFT

(75) Inventors: Jean-François Piet, Pibrac (FR); Stephane Perrin Decroux, Poucharramet (FR); Nicolas Molin, Nailloux (FR); Bastien Caruelle, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 23 days.

(21) Appl. No.: 13/519,153

(22) PCT Filed: Jan. 5, 2011

(86) PCT No.: PCT/FR2011/050014
§ 371 (c)(1),
(2), (4) Date: Jun. 26, 2012

(87) PCT Pub. No.: WO2011/086304
PCT Pub. Date: Jul. 21, 2011

(65) Prior Publication Data
US 2013/0026288 A1   Jan. 31, 2013

(30) Foreign Application Priority Data
Jan. 12, 2010 (FR) ...................................... 10 00110

(51) Int. Cl.
*B64C 1/40* (2006.01)
(52) U.S. Cl.
USPC ............................ 244/1 N; 244/214; 244/215

(58) Field of Classification Search
USPC ........................... 244/1 N, 215, 100 R, 102 R
See application file for complete search history.

(56) References Cited

U.S. PATENT DOCUMENTS

| 2,011,902 | A | * | 8/1935 | Guillermo | 244/215 |
| 2,383,102 | A | * | 8/1945 | Zap | 244/90 R |
| 2,685,470 | A | * | 8/1954 | Werner | 296/180.1 |
| 3,628,756 | A | * | 12/1971 | Johnson | 244/213 |
| 3,655,008 | A | * | 4/1972 | Millman | 181/216 |

(Continued)

FOREIGN PATENT DOCUMENTS

| WO | 2007113335 | 10/2007 |
| WO | 2008135647 | 11/2008 |

OTHER PUBLICATIONS

European Patent Office, International Search Report PCT/FR2011/050014, May 18, 2011 (3 pgs), PCT/ISA/237 Written Opinion French Language (6 pgs), English language translation of Form PCT/ISA/210 Written Opinion (6 pgs).

*Primary Examiner* — Christopher P Ellis
*Assistant Examiner* — Medhat Badawi
(74) *Attorney, Agent, or Firm* — Wood, Herron & Evans, LLP

(57) ABSTRACT

An aircraft includes at least one net for reducing aerodynamic noise from a structural element of the aircraft. The flexible net associated with the structural element is retractable and capable of occupying at least one position located between the following two end positions: a deployed position, in which the net is placed in a turbulence area, and a retracted position, in which the net is at least partially outside the turbulence area. The net may be automatically moved between positions based on an aircraft parameter such as speed or altitude.

8 Claims, 2 Drawing Sheets

(56) References Cited

U.S. PATENT DOCUMENTS

| | | | |
|---|---|---|---|
| 5,166,479 A * | 11/1992 | Gras et al. | 181/256 |
| 5,699,981 A * | 12/1997 | McGrath et al. | 244/1 N |
| 6,224,012 B1 * | 5/2001 | Wooley | 244/2 |
| 7,472,774 B1 * | 1/2009 | Monson et al. | 181/256 |
| 7,669,798 B2 * | 3/2010 | Guering et al. | 244/121 |
| 8,308,103 B2 * | 11/2012 | Boock et al. | 244/1 N |
| 2003/0226936 A1 | 12/2003 | Mau et al. | |
| 2004/0104301 A1 * | 6/2004 | Wickerhoff et al. | 244/10 |
| 2006/0102775 A1 * | 5/2006 | Chow et al. | 244/1 N |
| 2009/0200431 A1 * | 8/2009 | Konings et al. | 244/213 |
| 2009/0321559 A1 * | 12/2009 | Chow et al. | 244/1 N |
| 2010/0084508 A1 * | 4/2010 | Hirai et al. | 244/1 N |
| 2010/0108805 A1 | 5/2010 | Piet et al. | |
| 2010/0288876 A1 * | 11/2010 | Chow et al. | 244/1 N |
| 2010/0294883 A1 * | 11/2010 | Trich et al. | 244/1 N |
| 2011/0272532 A1 * | 11/2011 | Matsuda | 244/215 |

* cited by examiner

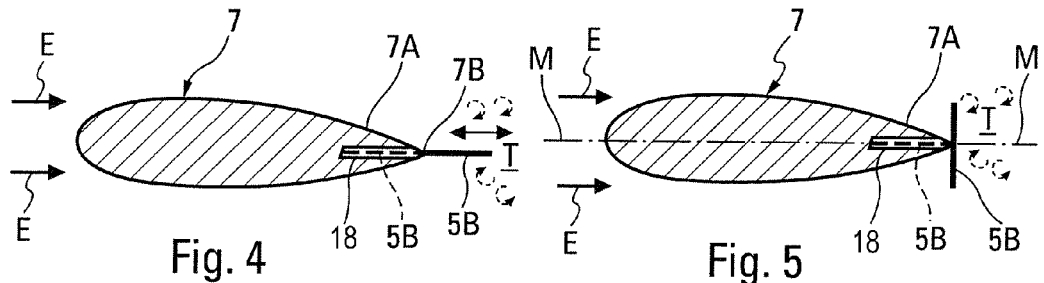
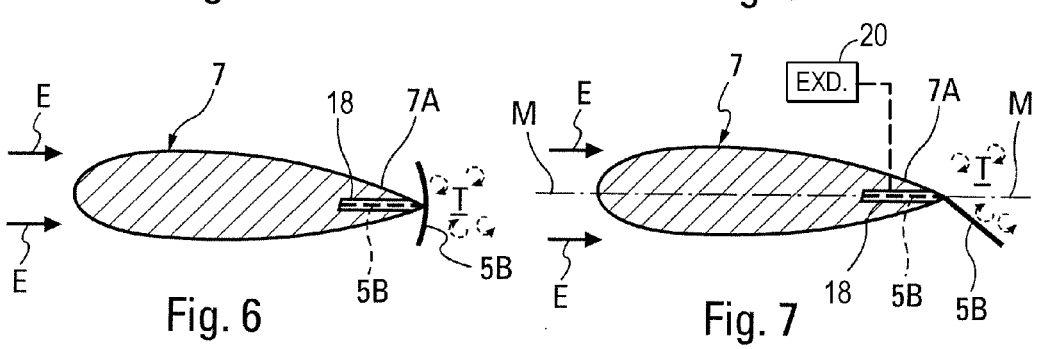
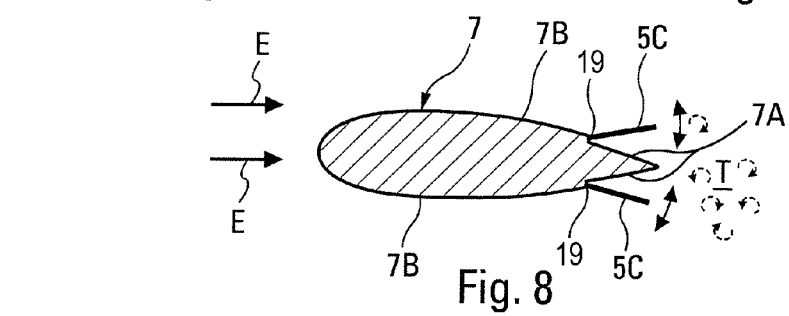
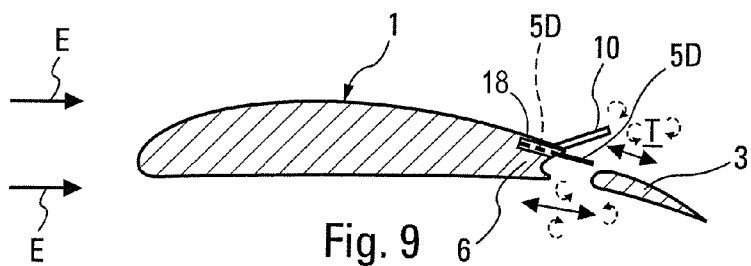
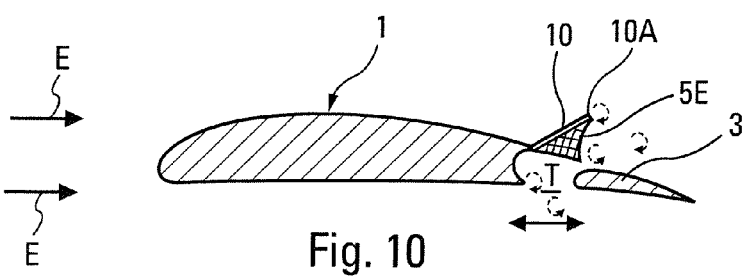

AIRCRAFT WITH AT LEAST ONE NET FOR REDUCING AERODYNAMIC NOISE FROM A STRUCTURAL ELEMENT OF THE AIRCRAFT

This application claims priority, under Section 371 and/or as a continuation under Section 120, to PCT Application No. PCT/FR2011/050014, filed on Jan. 5, 2011, which claims priority to French Application No. 1000110, filed on Jan. 12, 2010.

TECHNICAL FIELD

The present invention relates to an aircraft comprising at least one net for reducing aerodynamic noise from a structural element of said aircraft generated upon a movement of the latter.

BACKGROUND

It is known that there are numerous sources of noise on an aircraft, for example, a transport airplane, generated by an air flow around structural elements of the aircraft, which are either stationary (for instance the suspension struts, the wings, etc.) or mobile (for instance the leading edge slats, the trailing edge flaps, the airbrakes, etc.). Indeed, the interaction of such air flow with a structural element creates a turbulence area in the vicinity of the downstream part of said element, generating alone or thru an interaction with another auxiliary structural element of the aircraft arranged within said turbulence area, undesirable aerodynamic noise.

In order to reduce the generated noise strength, it is known to arrange a net with geometric meshes in the vicinity of the downstream part of said structural element, within the turbulence area. Thus, the turbulences crossing the net are broken so that they lose the substance of their energy, thus leading to a reduction of the aerodynamic noise strength.

However, the presence of such noise reduction net on a structural element can highly degrade the performances of the aircraft upon some flight phases, including these for which a noise reduction is not necessary (for example, a cruising flight).

The object of the present invention is to remedy such disadvantage and including to avoid that the noise reduction net(s) substantially degrade(s) the performances of the latter upon a flight.

SUMMARY OF THE INVENTION

To this end, according to the invention, an aircraft including at least one aerodynamic structural element arranged in an air flow, said air flow around said element generating, at least on one of the ends thereof, a turbulence area at the origin of the noise; and at least one flexible net arranged on such end of said element, for reducing at least partially said generated noise, is remarkable in that said flexible net is retractable and can occupy at least one position comprised between the two following extreme positions:
one extended position in which said flexible net is arranged within said turbulence area; and
one retracted position in which said flexible net is at least partially outside said turbulence area.

Thus, thanks to the invention, the flexible net can be extended in the turbulence area at the origin of the undesirable aerodynamic noise, so as to reduce it upon given flight phases (approach, take off, etc.). It can further be retracted upon some flight phases of the aircraft (climbing, cruising, etc.), when it has no utility any longer so as to avoid a degradation of the performances of the aircraft.

Advantageously, the position of said net is automatically adaptable as a function of at least one parameter of said aircraft (for example, speed, altitude, incidence, etc.).

In particular, said net can be adaptive, i.e. the position adaptation of the latter is automatically actuated by only the ambient air flow (and thus of the speed of said aircraft).

Furthermore, the aircraft can include extension means for said net (being adapted for example to be formed by the structural element itself when it is mobile), intended to extend and retract the latter. Such extension means can for example be manually controlled by the pilots or, on the contrary, automatically.

Preferably, in the retracted position, said net can be either housed at least partially in said element, or even pressed against at least one wall of the latter.

Moreover, when said net occupies said retracted position, said net can advantageously be folded on itself.

In order to even optimize the noise reduction, said net can, in an extended position, present an optimized cross-section of the concave rounded type with respect to said air flow.

BRIEF DESCRIPTION OF THE DRAWINGS

The FIGS. of the accompanying drawings will make well understood how the invention can be implemented. On such FIGS., identical reference characters denote similar elements.

FIG. 4 is a schematic cross-sectional view of the strut of FIG. 3 along the line IV-IV.

FIG. 5 is a variation of the example illustrated on FIG. 4, with the net shown in a transverse orientation from the view of FIG. 4.

FIG. 6 is a variation of the example illustrated on FIG. 4, with the net shown in a concave orientation.

FIG. 7 is a variation of the example illustrated on FIG. 4, with the net shown pivoted from the position shown in FIG. 4.

FIG. 8 is a variation of the example illustrated on FIG. 4, with two nets being actuated by ambient air flow past the strut into position.

FIG. 9 is a cross-sectional view of an aircraft wing comprising a retractable noise reduction net according to a third exemplary embodiment of the invention, being intended to weaken the turbulences formed by an air flow around an airbrake mounted on the wing.

FIG. 10, similar to FIG. 9 shows a retractable noise reduction net according to a fourth exemplary embodiment of the invention to reduce the turbulences formed on the longitudinal end of a wing airbrake of an airplane.

DETAILED DESCRIPTION

Figure 1:
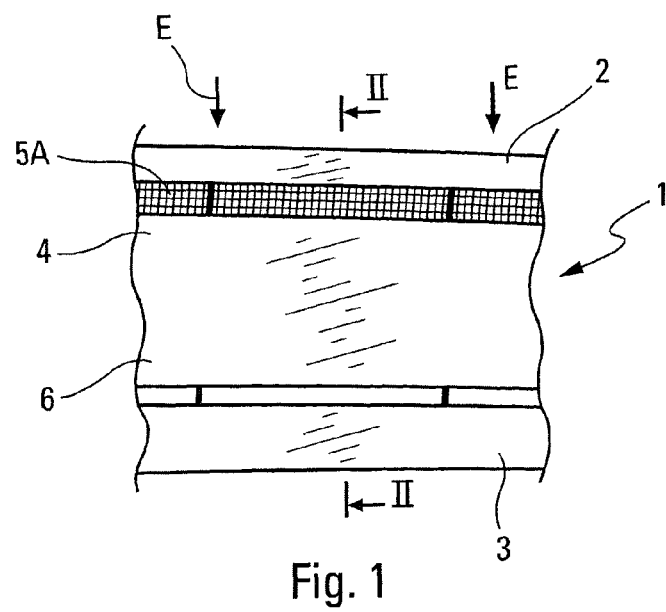
FIG. 1 shows, in a top partial schematic view, an airplane wing comprising a retractable noise reduction net according to a first exemplary embodiment of the invention. In such example, the net is used to break the turbulences formed by an air flow around a leading edge slat of the wing.
Figure 2:
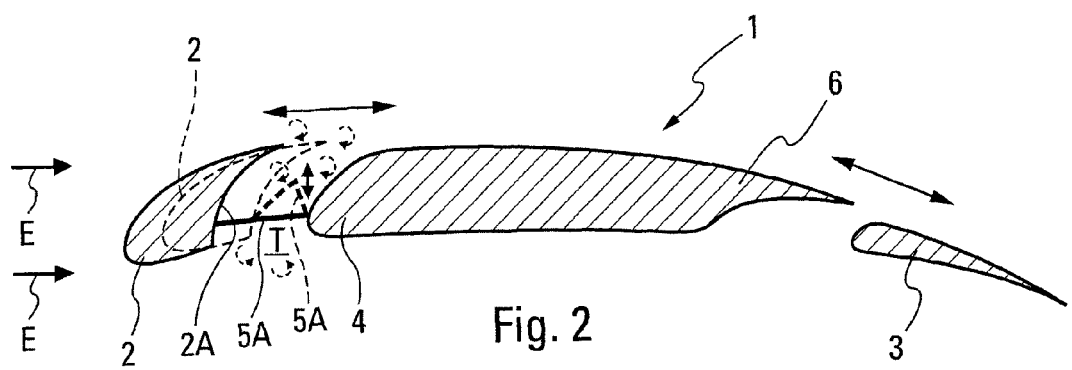
FIG. 2 is a cross-sectional view of the wing of FIG. 1 along the line II-II.

On FIGS. 1 and 2, according to the first exemplary embodiment of the invention, there is illustrated an airplane wing 1 provided with a leading edge slat 2 and a trailing edge flap 3, both being mobile.

As shown on FIG. 2, the slat 2 is represented in a continuous line, when it is integrally retracted, and in a discontinuous line when it occupies a partially extended position.

In an integrally extended position, an air flow (symbolized by the arrow E) around the slat 2 generates a turbulence area T in the vicinity of the downstream part of the latter. The upstream part 4 of the wing 1, being arranged in the downstream extension of the extended slat 2, is then immersed at least partially in the turbulence area T. The interaction of the turbulences with the upstream part 4 of the wing 1 causes aerodynamic noise, which is in particular undesirable upon an approach or a take off phase.

According to the invention, to reduce at least in part such undesirable aerodynamic noise, a noise reduction net 5A is arranged between the slat 2 and the upstream part 4 of the wing 1, thereby breaking the turbulences being formed and reducing the noise strength on such a way. The net 5A extends longitudinally between the slat 2 and the wing 1 and is fastened, on one side, to the undersurface 2A of said slat 2 and, on the other side, to the opposite upstream part 4 of said wing 1.

The net 5A, for example made with geometric meshes, is flexible and foldable. It can occupy at least one intermediate position between the two following extreme positions:
  one extended position in which it is arranged in said turbulence area T (the net 5A is represented in a continuous line in this position on FIG. 2). Such an extended position corresponds to an integral extension of the slat 2; and
  one retracted position in which said net 5A is outside said air flow E. Such a retracted position coincides with an entirely folded position of the slat 2 on the wing 1. In such retracted position, the net 5A is folded on itself at least one time toward the undersurface 2A of the slat 2. It is moreover pressed against the latter.

On FIG. 2, the net 5A is also represented in a discontinuous line in an intermediate position between the two above mentioned extreme positions, in association with a partial extension of the slat 2.

As the net 5A is an integral part of the slat 2, the extension of the latter (manually controlled by the pilots or automatically) causes the extension of the net 5A. It is the same for the folding of the net 5A. It other words, the leading edge slat 2 plays the role of extension device for the net 5A.

Figure 3:
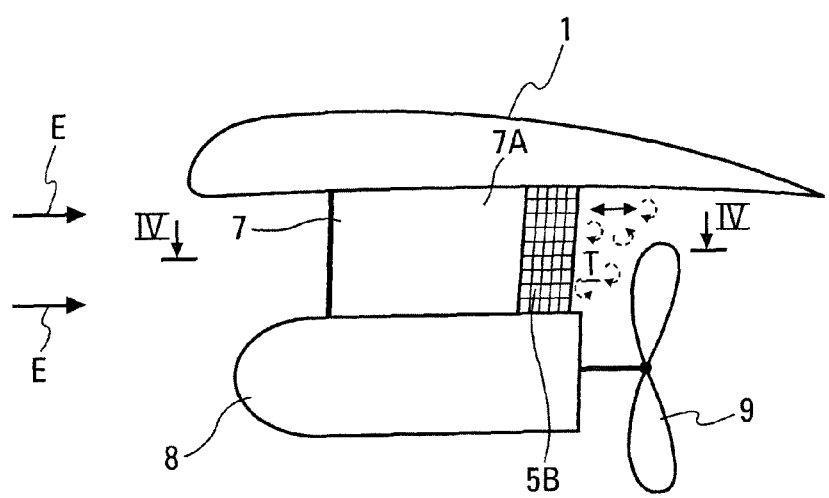
FIG. 3 is a profile schematic view of a suspension strut in a turboprop with propulsive propeller provided with a retractable noise reduction net according to a second exemplary embodiment of the invention.

In the second exemplary embodiment according to the invention and illustrated on FIGS. 3 and 4, a suspension strut 7 of a turboprop 8 with propulsive propeller 9 mounted under an airplane wing 1 is considered. An airflow E around the strut 7 leads to the formation of a turbulence area T in the vicinity of the downstream end 7A of said strut 7 which, when it interacts with the propeller 9 arranged downstream from the latter, generates undesirable noise.

Thus, according to the invention, in order to reduce the noise being generated, a retractable net 5B is arranged at the level of the downstream end 7A of the suspension strut 7. It extends along the latter for example over at least one part of the height thereof.

Moreover, the net 5B is able to occupy at least one position between the two following extreme positions:
  one extended position where it is arranged within said turbulence area T (the net 5B is represented in a continuous line in such latter position on FIG. 4). In this case, the net 5B, which is substantially planar, is arranged on the rear of the strut 7, as the extension of the external sidewalls 7B of the latter, to reduce the pressure jump downstream from the strut 7. Alternatively, the net 5B could be extended in the extended position orthogonally to the median vertical plane M passing thru the strut 7 (FIG. 5) and possibly also present an optimized shape (FIG. 6) for example with a rounded concave cross-section with respect to the air flow E, so as to reinforce the reduction of the aerodynamic noise. In another variation of the extended position illustrated on FIG. 7, the plane net 5B could be, in an extended position, slanted with respect to the medium vertical plane M of the strut 7;
  one retracted position where the net 5B is inserted within a housing 18 provided to this end in the downstream part 7A of the strut 7 (the net 5B is represented in the retracted position in a discontinuous line in each of FIGS. 4 through 7). The net 5B is thus outside the air flow E and the turbulence area T in this retracted position.

The operations of extension and retraction of the net 5B within the housing 18 are performed by an extension device 20 (shown as a schematic box in FIG. 7 without further limiting details shown), that could be automatically controlled as a function of an airplane parameter (for example speed, altitude, flight phase, etc.) or, on the contrary, manually by a voluntary action of the pilots.

In another variation of the second exemplary embodiment represented on FIG. 8, two adaptive nets 5C, extending along the strut 7, are arranged respectively on the downstream end of the external side walls 7B of the strut 7. Each net 5C is fastened to the corresponding side wall 7B via the upstream end 19 of each net 5C.

The adaptive nets 5C are held in an extended position for which they are arranged in the turbulence area T using an extension device, for example an elastic type member that spontaneously biases or forces the nets 5C into the extended position in the absence of an air flow.

Moreover, depending upon the airplane speed and under the action of the airflow E, the nets 5C are able to occupy a plurality of intermediate positions between the extended position and a retracted position (in which each net 5C is pressed against the corresponding side wall 7B of the strut 7). Thus, the higher the speed of the airplane, the bigger the air flow E pushing on the nets 5C and the lesser the nets 5C are extended.

In such a way, an automatic adjustment of the position of the nets 5C as a function of the airplane speed (a speed threshold can be implemented by the design of the extension device) is performed so as to avoid a degradation of the performances of the latter during the flight (including upon a cruising phase) while reducing aerodynamic noise when it is useful (for example upon a take off or an approach phase).

Furthermore, on FIG. 9, there are illustrated according to the third exemplary embodiment of the invention, a cross-section of the aircraft wing 1 provided with a trailing edge flap 3 and an airbrake 10 (represented in an extended position).

In order to reduce the turbulences T formed by an aerodynamic flow E around the airbrake 10 being extended, a retractable net 5D is arranged, longitudinally extending along said wing 1 on the downstream part 6 of the wing 1.

The extension of the net 5D from a retracted position (the net 5D is represented in a discontinuous line), in which it is inserted in a housing 18 arranged in the downstream part 6 of said wing 1, to an extended position (the net 5D is represented in a continuous line), in which it is arranged in the turbulence area T, can be related to the extension of the flap 3 of the airbrake 10. Such an extension of the net 5D can be obtained thru an extension device (not represented in this FIG.).

According to the fourth exemplary embodiment shown in FIG. 10, a foldable net 5E can be arranged on each of the two longitudinal ends 10A of the airbrake 10. When the airbrake 10 is extended, the nets 5E occupy an extended position (FIG. 10) and, when the airbrake 10 is retracted, the nets 5E are folded on themselves in a retracted position (not represented). The airbrake 10 is then used as the extension device for the nets 5E.

On such a way, the noise generated on the longitudinal ends 10A of the airbrake 10 (also called "corner noise") can be reduced.

The invention claimed is:

1. An aircraft comprising:
   at least one aerodynamic structural element arranged in an air flow, the air flow around said element generating, at least on one downstream end of said element, a turbulence area that produces a generated noise; and
   at least one flexible net arranged on said downstream end of said aerodynamic structural element, for reducing at least partially said generated noise, said flexible net being selectively extendable and retractable relative to said aerodynamic structural element such that said flexible net moves to at least the following positions:
   one extended position in which said flexible net is arranged within the turbulence area;
   one retracted position in which said flexible net is at least partially outside the turbulence area; and
   at least one intermediate position between said one extended position and said one retracted position.

2. The aircraft according to claim 1, further comprising:
   an extension device that automatically adjusts the position of said net as a function of at least one parameter of the aircraft.

3. The aircraft according to claim 2, wherein said extension device biases said net against the air flow such that the position adjustment of said net between the one extended position and the one retracted position is automatically actuated by the air flow pushing against the bias of the extension device.

4. The aircraft according to claim 1, further comprising:
   an extension device that manually or automatically adjusts the position of said net.

5. The aircraft according to claim 1, wherein, in a retracted position, said net is housed at least partially within a housing in said structural element.

6. The aircraft according to claim 1, wherein, in a retracted position, said net is pressed against at least one wall of said structural element.

7. The aircraft according to claim 1, wherein said net is able to be folded on itself when said net occupies the retracted position.

8. The aircraft according to claim 1, wherein, in an extended position, said net presents an optimized cross-section of the concave rounded type with respect to the air flow.

* * * * *